United States Patent
Kuno

(10) Patent No.: US 8,325,395 B2
(45) Date of Patent: Dec. 4, 2012

(54) APPARATUS AND METHOD FOR PROCESSING IMAGE INCLUDING WHITE BALANCE CORRECTION

(75) Inventor: Masashi Kuno, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1063 days.

(21) Appl. No.: 11/567,507

(22) Filed: Dec. 6, 2006

(65) Prior Publication Data

US 2007/0127093 A1 Jun. 7, 2007

(30) Foreign Application Priority Data

Dec. 7, 2005 (JP) ................................. 2005-353843

(51) Int. Cl.
*H04N 1/46* (2006.01)
(52) U.S. Cl. ........ 358/516; 358/518; 382/162; 382/166; 382/167; 382/274; 348/223.1
(58) Field of Classification Search .................. 358/516, 358/518; 382/167, 274, 162, 166, 165, 221, 382/224; 348/223.1, E9.052, 223
See application file for complete search history.

(56) References Cited

U.S. PATENT DOCUMENTS

| 5,357,352 | A | 10/1994 | Eschbach |
| 5,619,347 | A * | 4/1997 | Taniguchi et al. ............ 358/516 |
| 6,664,973 | B1 * | 12/2003 | Iwamoto et al. .............. 345/589 |
| 6,728,401 | B1 * | 4/2004 | Hardeberg ..................... 382/167 |
| 6,947,594 | B2 * | 9/2005 | Watanabe et al. ............. 382/167 |
| 6,965,401 | B1 | 11/2005 | Takei |
| 7,436,995 | B2 * | 10/2008 | Ito et al. ......................... 382/162 |
| 7,529,405 | B2 * | 5/2009 | Masuno et al. ................ 382/166 |
| 2001/0028739 | A1 * | 10/2001 | Lee et al. ........................ 382/165 |
| 2003/0179926 | A1 | 9/2003 | Yamazoe et al. |
| 2005/0018226 | A1 * | 1/2005 | Chiba ............................ 358/1.9 |
| 2005/0041115 | A1 | 2/2005 | Choi |
| 2005/0243186 | A1 * | 11/2005 | Hayaishi .................... 348/223.1 |
| 2006/0098253 | A1 * | 5/2006 | Masuno et al. ................ 358/518 |
| 2006/0284991 | A1 * | 12/2006 | Ikeda ......................... 348/223.1 |
| 2007/0008417 | A1 * | 1/2007 | Kaplinsky et al. ......... 348/223.1 |

FOREIGN PATENT DOCUMENTS

| JP | 02-275938 | 11/1990 |
| JP | 07-222016 | 8/1995 |
| JP | 2000-350232 | 12/2000 |
| JP | 2003-087807 | 3/2003 |
| JP | 2003-283853 | 10/2003 |
| JP | 2004-312553 | 11/2004 |
| JP | 2005-012763 | 1/2005 |
| JP | 2005-142890 | 6/2005 |

OTHER PUBLICATIONS

Office Action for corresponding Japanese Patent Application 2005-353843 mailed Mar. 2, 2010.

* cited by examiner

*Primary Examiner* — Twyler Haskins
*Assistant Examiner* — Dennis Dicker
(74) *Attorney, Agent, or Firm* — Banner & Witcoff, Ltd.

(57) ABSTRACT

An apparatus for processing an image, includes: a color information determination unit; and a correction amount setting unit. The color information determination unit classifies a plurality of pixels configuring an image into a plurality of groups according to a brightness thereof, and determines representative color information for each of the groups. The correction amount setting unit sets a correction amount for a white balance correction based on the representative color information determined for at least a part of the groups.

24 Claims, 11 Drawing Sheets
(4 of 11 Drawing Sheet(s) Filed in Color)

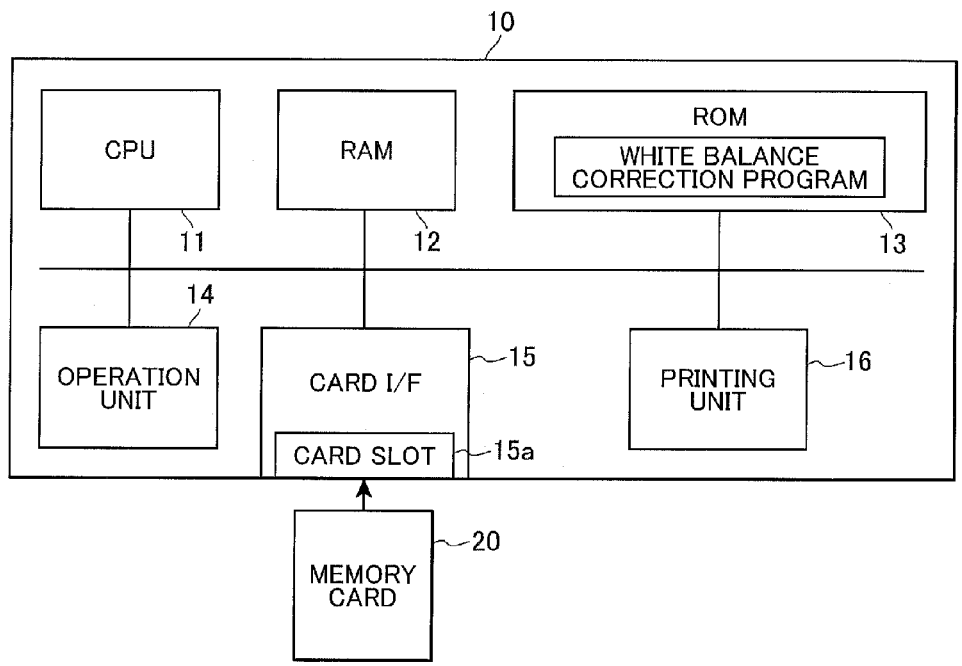

FIG.3

WHITE BALANCE TABLE

| RANGE NUMBER | a* AVERAGE | b* AVERAGE | C AVERAGE | h AVERAGE | a* CORRECTION AMOUNT | b* CORRECTION AMOUNT |
|---|---|---|---|---|---|---|
| 1 | 0 | 0 | 0 | 0 | 0 | 0 |
| 2 | 0 | 0 | 0 | 0 | 0 | 0 |
| 3 | 0 | 0 | 0 | 0 | 0 | 0 |
| ... | ... | ... | ... | ... | ... | ... |
| 19 | 0 | 0 | 0 | 0 | 0 | 0 |
| 20 | 0 | 0 | 0 | 0 | 0 | 0 |

BRIGHTNESS  HIGH ←――――――――――→ LOW

ACHROMATIC
COLOR AXIS

ACHROMATIC
COLOR AXIS

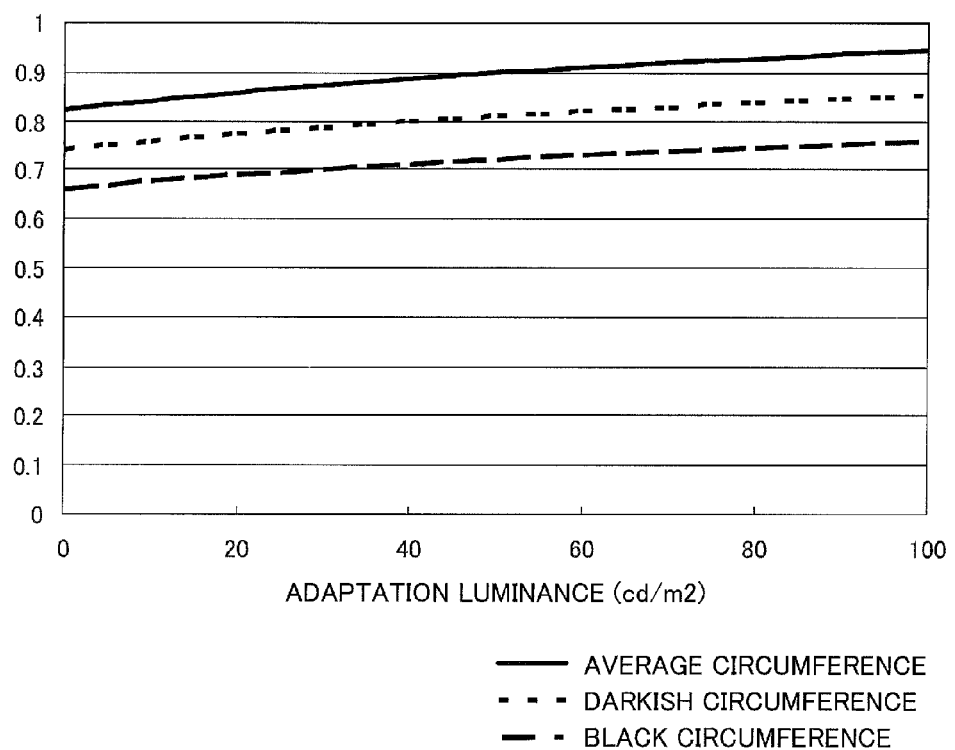

APPARATUS AND METHOD FOR PROCESSING IMAGE INCLUDING WHITE BALANCE CORRECTION

CROSS REFERENCE TO RELATED APPLICATION

This application claims priority from Japanese Patent Application No. 2005-353843 filed Dec. 7, 2005, the entire content of which is incorporated herein by reference.

TECHNICAL FIELD

The disclosure relates to an apparatus and a method for processing an image by properly executing a white balance correction.

BACKGROUND

Conventionally, as a correction for unnaturally reproduced color raised in a picked-up image due to the difference of color temperature of a light source illuminating a pick-up subject or a subject to be picked up, there is known a correction that depicts parts, which should fundamentally be white, with white correctly (that is, the white balance correction). For example, a reproduced image which is picked up by an image pick-up device such as a digital still camera using an image pick-up element or a CCD, a CMOS, etc., comes to be a red-tinged image in case the light source is an incandescent lamp, while comes to be a blue-tinged image in case the light source is a fluorescent lamp. So as to correct the unnaturally reproduced color of a picked-up image to natural color, the white balance correction according to color temperature of a light source is performed.

As a method for carrying out the white balance correction, roughly, there are known a method in which color temperature of a light source is measured and the correction is carried out based on thus measured color temperature, and a method in which color information of a picked-up image is analyzed to figure out color temperature of a light source and the correction is carried out. In case of employing the former method, even if comparatively appropriate white balance correction is realized, a structure to measure color temperature of a light source such as a sensor has to be arranged in an image pick-up device, which undesirably enlarge the image pick-up device in size as well as increase the manufacturing cost thereof. Accordingly, various manners to appropriately carry out the white balance correction by employing the latter method have been proposed.

For example, there is known a method in which, assuming that the average of color of an entire picked-up image becomes achromatic color, deviance of the average color balance of color of an entire picked-up image is determined to correct the deviance. In employing this method, the white balance correction can be performed by comparatively easily presuming color temperature of a light source from a picked-up image. However, since this correction manner is based on the assumption that the average of color of an entire picked-up image becomes achromatic color, the white balance correction cannot be correctly carried out as for a picked-up image that does not fulfill the assumption.

United States Patent Application Publication No. US2005/0041115A1 discloses a method that can comparatively appropriately detect white by determining luminance level ranges to which white belongs, and selecting the final white value by performing image division in thus determined luminance level ranges. Specifically, color data of a picked-up image is classified into luminance level ranges of "n" pieces (ranges which are obtained by evenly dividing an interval between the minimum luminance level and the maximum luminance level), and color data which is closest to white is detected based on color data which is classified into "n" luminance levels, and a luminance level to which the color data belongs is selected to the clip luminance level. Next, the picked-up image is divided into regions of "k*m" pieces, and for respective regions, color data that belongs to the clip luminance level range is stored among color data of the regions. Then, in each of the k*m regions, color data closest to white is selected as the white value. Next, among the k*m regions, one region that has the largest number of color data that belongs to the clip luminance level range is selected. Color data that is selected as the white value in the selected region is selected as the final white value. Then, color correction is carried out based on thus selected white value.

SUMMARY

However, as for a picked-up image in which a pick-up subject of specific color exists in an entire image area, for example, as for an image of a flower of blue color that is picked up by coming close thereto, which is shown in FIG. 9A, inappropriate correction may be performed to undesirably change the blue flower into a white flower.

In view of the foregoing, it is an object of the invention to provide an apparatus and a method for processing an image while performing appropriate white balance correction.

In order to attain the above and other objects, the invention provides an apparatus for processing an image, including: a color information determination unit; and a correction amount setting unit. The color information determination unit classifies a plurality of pixels configuring an image into a plurality of groups according to a brightness thereof, and determines representative color information for each of the groups. The correction amount setting unit sets a correction amount for a white balance correction based on the representative color information determined for at least a part of the groups.

According to another aspect, the invention provides an apparatus for processing an image, including: a color information determination unit; and a correction amount setting unit. The color information determination unit classifies a plurality of pixels configuring an image into a plurality of groups according to a brightness thereof, and determines average color information for each of the groups. The correction amount setting unit sets a correction amount for a white balance correction based on the average color information determined for at least a part of the groups.

According to another aspect, the invention provides a method for processing an image, including: classifying a plurality of pixels configuring an image into a plurality of groups according to a brightness thereof, and determining representative color information for each of the groups; and setting a correction amount for a white balance correction based on the representative color information determined for at least a part of the groups.

According to another aspect, the invention provides a method for processing an image, including: classifying a plurality of pixels configuring an image into a plurality of groups according to a brightness thereof, and determining average color information for each of the groups; and setting a correction amount for a white balance correction based on the average color information determined for at least a part of the groups.

According to another aspect, the invention provides a storage medium storing a set of program instructions executable on a data processing device, instructions including: classifying a plurality of pixels configuring an image into a plurality of groups according to a brightness thereof, and determining representative color information for each of the groups; and setting a correction amount for a white balance correction based on the representative color information determined for at least a part of the groups.

According to another aspect, the invention provides a storage medium storing a set of program instructions executable on a data processing device, instructions including: classifying a plurality of pixels configuring an image into a plurality of groups according to a brightness thereof, and determining average color information for each of the groups; and setting a correction amount for a white balance correction based on the average color information determined for at least a part of the groups.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative aspects in accordance with the invention will be described in detail with reference to the following figures wherein:

FIG. 1 shows a block diagram indicative of the schematic configuration of a printer according to an aspect of the invention;

FIG. 2 shows an explanatory diagram of an L* division table;

FIG. 3 shows an explanatory diagram of a white balance table;

FIG. 11 shows a graphical representation indicative of the relation between adaptation luminance and partial adaptation factor.

DETAILED DESCRIPTION

Figure 4:
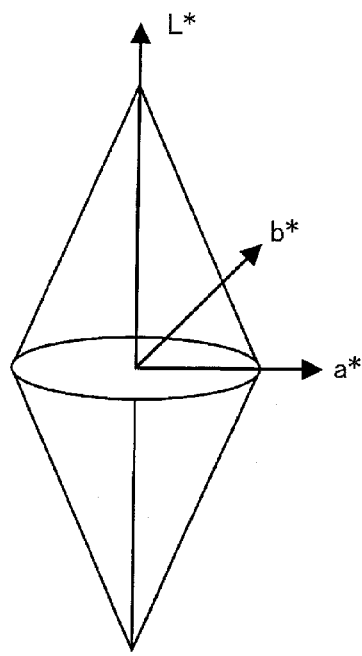
FIG. 4 shows an explanatory diagram of the CIELAB color system.

A method and apparatus for processing an image according to some aspect of the invention will be described while referring to the accompanying drawings wherein like parts and components are designated by the same reference numerals to avoid duplicating description.

FIG. 1 shows a block diagram indicative of the schematic configuration of a printer 10 that performs an image processing according to the aspect of the invention.

This printer 10 is provided with a function of directly reading out image data from a memory card 20 (handheld storage medium), in which image data of an image picked up by a digital still camera, etc., is stored, without using another information processing apparatus such as a personal computer, and printing thus read out image data (so-called direct printing function) As shown in FIG. 1, as a hardware configuration, the printer 10 includes a CPU 11, a RAM 12, a ROM 13, an operation unit 14, a card interface (I/F) 15, and a printing unit 16.

The CPU 11 controls the respective parts of the printer 10 by performing processing in accordance with programs stored in the ROM 13.

The RAM 12 is used as a temporary work area of the CPU 11. Furthermore, a storage region for data storage tables (an L* division table of FIG. 2 and a white balance table of FIG. 3 to be described later) is reserved in the RAM 12 to be used in a processing to be described later.

The L* division table shown in FIG. 2 is a table that is used to classify a plurality of pixels configuring an image according to the brightness thereof. Specifically, as shown in FIG. 2, for respective brightness ranges which are obtained by evenly dividing a brightness (L*) whose values ranging from "0" to "100.0" (in this example, 1,000 brightness ranges each having the width of "0.1"), the number of classified pixels (the number of appearing pixels) and the respective sum totals of a* value and b* value of classified pixels are stored. The initial values of these values are set to "zero (0)".

The white balance table shown in FIG. 3 is a table that is used to evenly classify a plurality of pixels configuring an image into groups of a predetermined number (20, in this example) according to the brightness thereof. Specifically, as shown in FIG. 3, for each group, the average values of a* value and b* value of classified pixels, the average values of color saturation "C" and hue "h" of classified pixels, and correction amounts for the white balance correction about a* value and b* value of pixels are stored. The initial values of these values are set to "zero (0)".

In the ROM 13, various programs such as a white balance correction program used to make the CPU 11 perform the direct printing processing, to be described later, are stored.

The operation unit 14 has arranged thereon a plurality of keys which are used when the user performs input operation, and sends a signal corresponding to the input operation to the CPU 11.

The card interface 15 has formed therein a card slot 15a into which the memory card 20 can be directly inserted, and reads out data (image data of a picked-up image) stored in the memory card 20 which is inserted in the card slot 15a based on a command from the CPU 11.

Based on a command from the CPU 11, the printing unit 16 feeds sheets one by one from a paper feeding unit that can stock a plurality of sheets as recording media, and prints color images represented by image data on the sheets to send the sheets to a discharge unit.

Next, the function of the white balance correction of the printer 10 will be explained.

The printer 10 reads out image data from the memory card 20 which is inserted in the card slot 15a, and converts respective pixels configuring an image represented by the image data to parameters that represent the brightness and color information (color saturation and hue), and classifies the respective pixels according to the brightness thereof. Specifically, the brightness of the respective pixels is calculated using the CIELAB color system.

The CIELAB color system, which is widely known, will be explained here.

As shown in FIG. 4, in the CIELAB color system, $L^*$, $a^*$, $b^*$ are stereoscopically represented in the three dimension. The $L^*$ indicates the brightness, and the brightness increases in the direction along which the value of the $L^*$ grows larger. The $a^*$, $b^*$ indicate color information. The positive direction and negative direction of the $a^*$ approximately indicate red color and green color amounts, respectively. The positive direction and negative direction of the $b^*$ approximately indicate yellow color and blue color amounts, respectively. Since color information converges to the central axis (axis at which $a^*=b^*=0$) at the brightest part and darkest part, the value of color information is made small at bright parts and dark parts. Furthermore, in the CIELAB color system, the color saturation "C" is represented by the Euclidean distance of $C=\text{sqrt}(a^2+b^2)$, and the hue "h" is represented by the angle in the counterclockwise direction, with the positive direction of $a^*$ being set to "0" degree when $b^*=$"0".

In the printer 10, for an image represented by image data, the average value of color information is calculated for each of the plurality of (20, in this example) groups whose brightness levels are different from each other. Specifically, brightness ranges for the respective groups are not fixed, but, after examining the number of pixels appearing in respective brightness levels, brightness ranges for the respective groups are set up such that the numbers of pixels classified into groups of the predetermined number (20) become equal with each other. This is because, when brightness ranges are fixedly set up, in case of an image in which the numbers of appearing pixels are biased toward some part of brightness ranges, pixels scarcely exist in specific groups, and the degree of reliability of the average value of color information with respect to those specific groups may be lowered.

Next, based on the average value of color information calculated for each of the groups, the deviance state from achromatic color is checked for each of the groups. In case all the deviance directions are directed in the same direction, the white balance is determined to be deviated in this direction due to the influence of color temperature of a light source. On the other hand, in case all the deviance directions are not directed in the same direction, it is determined that the deviance is not due to deviation of the white balance, but due to the influence of color of a picked-up subject. For example, it can be estimated that subjects of a specific color might exist in an image with high proportion.

Figure 5A:
FIGS. 5A and 5B show explanatory diagrams for explaining the difference between the states of color deviance.
Figure 5B:

That is, due to the influence of color temperature of a light source, the entire axis of achromatic color comes to be deviated as shown in FIG. 5(a). On the other hand, due to the influence of color of a pick-up subject, as shown in FIG. 5(b), the axis is not deviated entirely, but parts of the axis come to be deviated in different directions from one another. Accordingly, based on the difference of tendency, it is judged whether or not color of an image is influenced from color of a pick-up subject. A white balance correction is prevented from being carried out when color of the image is deviated due to the influence of color of a pick-up subject.

Figure 6:
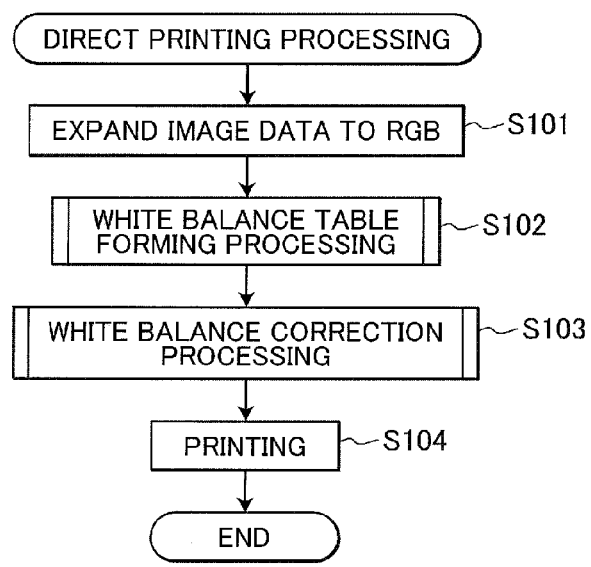
FIG. 6 shows a flowchart of the direct printing processing.

Next, a direct printing processing carried out by the CPU 11 in accordance with the white balance correction program so as to realize the white balance correction function will be explained with reference to a flowchart shown in FIG. 6. This direct printing processing is started when predetermined input operation to print (direct-print) an image represented by image data stored in the memory card 20 is carried out at the operation unit 14.

When the direct printing processing is started, firstly, in S101, image data to be printed is expanded to RGB data on the RAM 12. Specifically, image data that is compressed under the JPEG form or the like and stored in the memory card 20 is read out, and is expanded to uncompressed image data of RGB each consisting of 8 bits.

Next, in S102, a white balance table forming processing is performed to form a white balance table for image data expanded in S101. Specific contents of the white balance table forming processing will be explained later with reference to FIG. 7.

Next, in S103, using the white balance table formed in S102, a white balance correction processing is performed to correct the white balance of the image data to be printed. Specific contents of the white balance correction processing will be explained later with reference to FIG. 8.

Then, in S104, an image represented by the image data to be printed is printed by the printing unit 16. Subsequently, the direct printing processing is ended.

Figure 7:
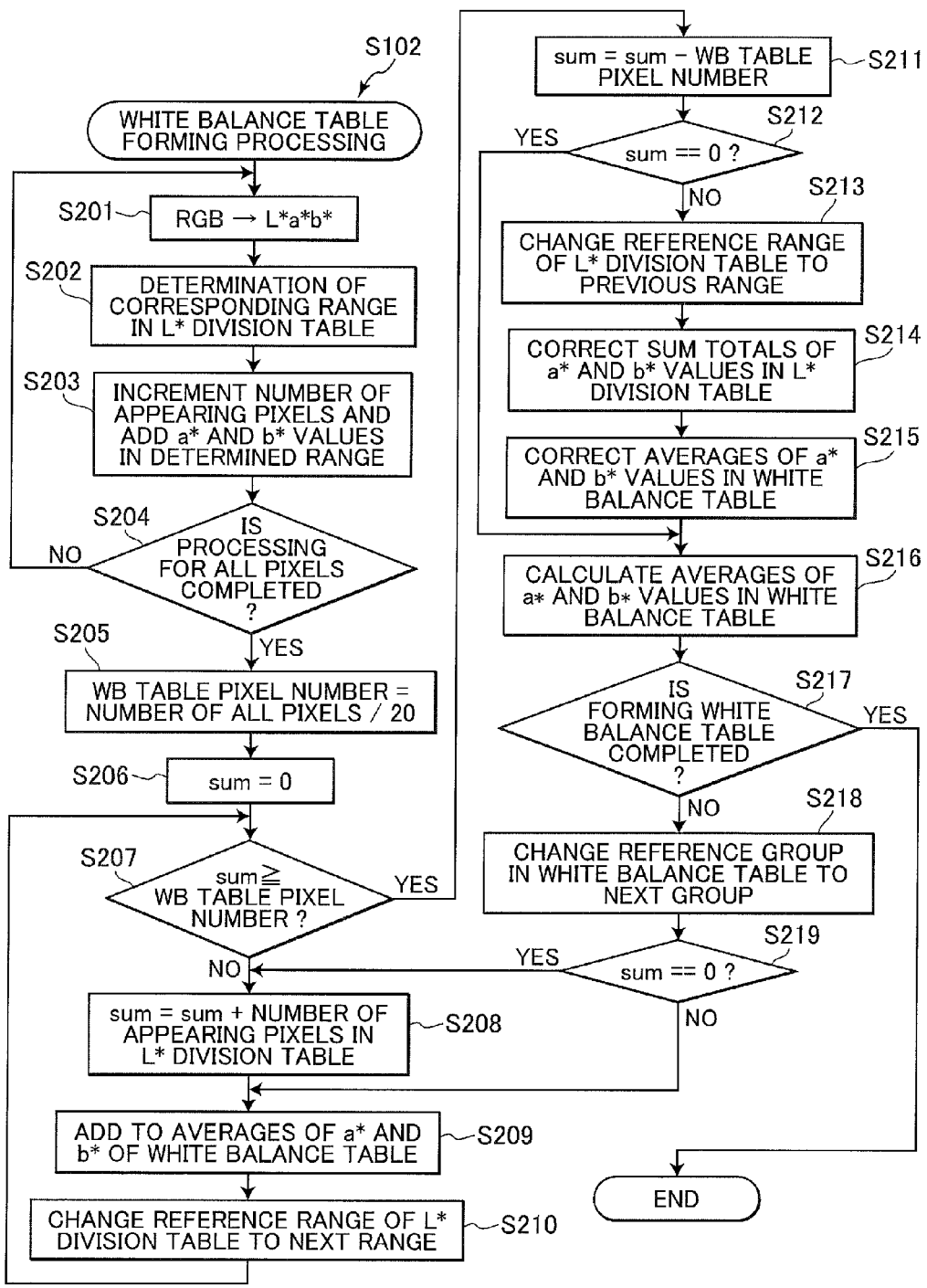
FIG. 7 shows a flowchart of a white balance table forming processing in the flowchart of FIG. 6.

Next, the white balance table forming processing carried out in S102 of the direct printing processing will be explained with reference to a flowchart shown in FIG. 7. Initially, respective values stored in the $L^*$ division table and white balance table are set to initial values (state shown in FIG. 2 and FIG. 3).

When the white balance table forming processing is started, firstly, in S201, the value of one pixel that is targeted as a pixel to be processed (referred to as a processing subject pixel, hereinafter) among all the pixels configuring the image to be printed is converted from the RGB value to the $L^* a^* b^*$ value. Specifically, after performing the color space conversion from the RGB to the CIEXYZ, the color space conversion from the CIEXYZ to the CIELAB is performed.

More specifically, the RGB value (R, G, B) of the processing subject pixel is first converted to an XYZ value (X, Y, Z) by calculating well-known formulas. The XYZ value (X, Y, Z) is then converted into an Lab value ($L^*$, $a^*$, $b^*$) through well-known formulas.

In this processing, a predetermined pixel (such as a pixel located at the upper left corner in the image) is set to the processing subject pixel at the time of starting the white balance table forming processing, and the processing subject pixel is changed in a preset order (an order under which the respective pixels are selected one by one in turn, that is, an order under which an identical pixel is not duplicately selected) every time the negative determination is given in S204 to be described later.

Next, in S202, the level of $L^*$ value of the processing subject pixel, which has been converted to the $L^* a^* b^*$ value in S201, is judged. Specifically, it is determined into which brightness range in the $L^*$ division table shown in FIG. 2 the $L^*$ value is classified.

Next, in S203, the number of pixels appearing in the brightness range in the $L^*$ division table that is determined in S202 is incremented by one (1), and the $a^*$ value and $b^*$ value of the processing subject pixel are added to the sum total of $a^*$ value and sum total of $b^*$ value in the $L^*$ division table.

Then, in S204, it is judged whether or not the processing for all the pixels configuring the image to be printed is completed.

If processing for all the pixels is not yet completed (no in S204), the processing is returned to S201.

On the other hand, if processing for all the pixels is completed and therefore that the $L^*$ division table is completed (yes in S204), processing goes to S205, wherein the number of pixels to be classified into each group of the white balance table shown in FIG. 3 (referred to as WE table pixel number, hereinafter) is calculated using the following formula (1) In the formula (1), the division number of white balance table is the number of groups into which pixels should be classified, which is set to "20" in advance in this example.

$$WB \text{ table pixel number} = \text{Number of all pixels/division number of white balance table} \quad \text{formula (1)}$$

Then, in S206, the value of variable sum to count the number of pixels is reset to zero ("0").

Then, in S207, it is judged whether or not the value of variable sum is equal to or larger than the WE table pixel number.

If the value of variable sum is smaller than the WB table pixel number (no in S207), the processing goes to S208, wherein the number of pixels appearing in a brightness range that is currently referred to (referred to as reference range, hereinafter) among the plurality of (1,000, in this example) brightness ranges in the L* division table is added to the sum. It is noted that at the time of starting the white balance table forming processing, the reference range of the L* division table is set to a brightness range whose brightness is the highest (brightness range whose range number is "1" in FIG. 2), and is changed in the processing of S210, S213 to be described later.

Then, in S209, the sum total of a* value and sum total of b* value in the reference range of the L* division table are added to the average value of a* value and average value of b* value in a group which is currently referred to (referred to as reference group, hereinafter) among the plurality of (20, in this example) groups of the white balance table. It is noted that at the time of starting the white balance table forming processing, the reference group of the white balance table is set to a group whose brightness is the highest (group whose range number is "1" in FIG. 3), and is changed in S218 to be described later.

Then, in S210, the reference range of the L* division table is changed to a brightness range whose brightness is one step lower than the brightness of the current reference range among all the brightness ranges in the L* division table, that is, a brightness range whose range number is incremented by one ("1") from the range number of the current brightness range. Then, the processing is returned to S207.

On the other hand, if the value of the variable sum is equal to or larger than the WB table pixel number (yes in S207), the processing goes to S211, and the WB table pixel number is subtracted from the value of the variable sum.

Then, in S212, it is judged whether or not the value of variable sum is "0".

If the value of variable sum is not equal to "0" (no in S212), the processing goes to S213, and the reference range of the L* division table is changed to a brightness range whose brightness is one step higher than the brightness of the current reference range among all the brightness ranges in the L* division table, that is, a brightness range whose range number is decremented by "1" from the range number of the current brightness range. That is, the reference range is returned to the previous range.

Then, in S214, the sum total of a* value and sum total of b* value of the reference range in the L* division table are corrected based on the following formulas (2), (3) The number of appearing pixels in the formulas (2), (3) is the number of pixels appearing in the reference range of the L* division table.

$$\text{Sum total of } a^* \text{ value} = \text{Sum total of } a^* \text{ value} \times \text{Value of sum/Number of appearing pixels} \quad \text{formula (2)}$$

$$\text{Sum total of } b^* \text{ value} = \text{Sum total of } b^* \text{ value} \times \text{Value of sum/Number of appearing pixels} \quad \text{formula (3)}$$

Then, in S215, the average value of a* value and average value of b* value of the reference group in the white balance table are corrected based on the following formulas (4), (5), and the processing goes to S216. It is noted that at this stage, the average value of a* value and average value of b* value of the reference group indicate sum totals of a* value and b* value of the reference group. The sum total of a* value and sum total of b* value in the formulas (4), (5) are the sum total of a* value and sum total of b* value of the reference range in the L* division table, that is, the values calculated by the formulas (2), (3).

$$\text{Average value of } a^* \text{ value} = \text{Average value of } a^* \text{ value} - \text{Sum total of } a^* \text{ value} \quad \text{formula (4)}$$

$$\text{Average value of } b^* \text{ value} = \text{Average value of } b^* \text{ value} - \text{Sum total of } b^* \text{ value} \quad \text{formula (5)}$$

On the other hand, if the value of variable sum is "0" (yes in S212), the processing goes to S216, without carrying out the correction processing of S213 to S215 to make the numbers of pixels classified into the respective groups equal to one another.

In S216, the average values of a* value and b* value of the reference group in the white balance table are calculated based on the following formulas (6), (7).

$$\text{Average value of } a^* \text{ value} = \text{Average value of } a^* \text{ value}/WB \text{ table pixel number} \quad \text{formula (6)}$$

$$\text{Average value of } b^* \text{ value} = \text{Average value of } b^* \text{ value}/WB \text{ table pixel number} \quad \text{formula (7)}$$

The thus calculated average value of a* value and average value of b* value become the criteria of judgment for the average deviance of color information from achromatic color (a*=b*=0). Furthermore, in S216, based on the thus calculated average value of a* value and average value of b* value, the average value of color saturation "C" and average value of hue "h" are calculated through the above-described definition of the color saturation "C" and hue "h" relative to the a* value and the b* value. It is noted that because the average value of color saturation "C" and average value of hue "h" can be derived from the average value of a* value and average value of b* value, the average value of color saturation "C" and average value of hue "h" may be calculated according to need without being stored in the white balance table.

Then, in S217, it is judged whether or not the formation of the white balance table is completed. Specifically, it is judged whether or not the reference group of the white balance table is a group whose brightness is the lowest and therefore whose range number is "20".

If the formation of the white balance table is not yet completed (no in S217), the processing goes to S218, and the reference group in the white balance table is changed to a group whose brightness is one step lower than the brightness of the current reference group in the white balance table and therefore whose range number is equal to a value that is incremented by "1" from the range number of the current reference group.

Then, in S219, it is judged whether or not the value of variable sum is equal to "0". If the value of variable sum is equal to "0" (yes in S219), the processing goes to S208 to perform the above-described processing.

On the other hand, if the value of variable sum is not equal to "0" (no in S219), processing goes to S209 to perform the above-described processing. In this case, the processing of S208 is not performed because the value of the number of appearing pixels in the reference range of the L* division table has already been added to the sum.

Furthermore, when the formation of the white balance table is completed (yes in S217), the processing of forming the white balance table is ended.

By performing the above-described processing, all the pixels configuring the image are evenly classified into the plurality of (20, in this example) groups in the white balance table, and the average value of a* value, average value of b* value, average value of color saturation "C", and average value of hue "h" are calculated for each of the groups.

Figure 8:
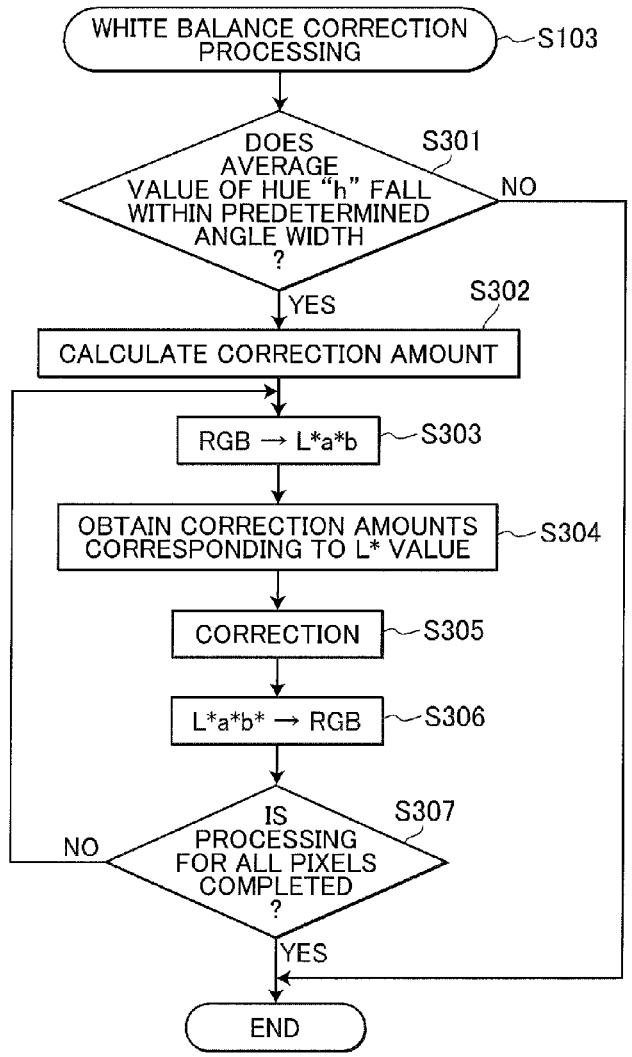
FIG. 8 shows a flowchart of a white balance correction processing in the flowchart of FIG. 6.

Next, the white balance correction processing that is performed in S103 of the direct printing processing (FIG. 6) will be explained with reference to a flowchart shown in FIG. 8.

When the white balance correction processing is started, firstly, in S301, it is judged whether or not the average values of hue "h" calculated for all of the groups with range numbers 1-18 in the white balance table fall within a predetermined angle width. For example, an angle width of 45 degrees (45-degree width) or 60 degrees (60-degree width) may be set up as the predetermined angle width. Experimentally, desirable results can be obtained when the angle width is from 45 degrees to 60 degrees (from 45-degree width to 60-degree width).

Thus, it is judged whether the average value of hue "h" for the groups with range numbers 1-18 varies in a relatively small angle width and therefore whether the tendency of hue "h" is relatively uniform over the brightness ranges with range numbers 1-18.

It is noted that as described above, among all the groups of the white balance table, two groups that have range numbers 19 and 20 and therefore that are low in brightness are not subjected to the judgment of S301. This is because the a* value and b* value become significantly small at parts of an image whose brightness is low and therefore the error of hue "h" is large in those groups with the range numbers 19 and 20 and therefore the hue "h" in those groups are low in reliability.

If the average values of hue "h" for all the groups with range numbers 1-18 fall within the predetermined angle width (yes in S301), the processing goes to S302, wherein a correction amount is determined for each group to make the average of color of pixels classified into the each group come close to the achromatic color. Specifically, a correction amount for the a* value (referred to as a* correction amount, hereinafter) of a pixel and a correction amount for the b* value (referred to as b* correction amount, hereinafter) of a pixel are determined and stored in the white balance table.

It is now assumed that the a* correction amount were determined as a value that has a sign opposite from the a* average value but has the same absolute value with the a* average value and the b* correction amount were determined as a value that has a sign opposite from the b* average value but has the same absolute value with the b* average value. In such a case, when correction is carried out by using the a* correction amount and the b* correction amount, the a* average value and b* average value will be corrected to "0". The average of color of pixels will become completely equal to the achromatic color and the average deviance of color information will become completely "0". Performing such a rigid correction will, however, undesirably generate unnatural images. So, in this example, the a* correction amount is determined to a value that is obtained by multiplying the a* average value by a value (−1) and a preset adjustment constant (a value less than "1" and greater than "0", for example "0.8"), and the b* correction amount is determined to a value that is obtained by multiplying the b* average value by the value (−1) and the adjustment constant the same as that for the a* correction amount In this way, the correction amount for the white balance correction is set to a value whose absolute value is smaller than the absolute value of the above-described comparative correction amount that will set the average deviance of color information to "0". Thus, the correction amount for the white balance correction is set to a value that will shift the average deviance of color information by an amount smaller than another amount (comparative amount) that is required to shift the average deviance of color information to zero (0).

Then, in S303, the value of the processing subject pixel is converted from the RGB value to the L* a* b* value in the same manner as described above.

In this processing, a predetermined pixel (such as a pixel located at the upper left corner in an image) is set to the processing subject pixel at the time of starting the white balance correction processing, and the processing subject pixel is changed in a preset order (an order under which the respective pixels are selected one by one in turn, that is, an order under which an identical pixel is not duplicately selected) every time the negative determination is given in S307 to be described later.

Then, in S304, among the plural (20, in this example) groups in the white balance table, a group corresponding to the L* value of the processing subject pixel that is converted to the L* a* b* value in S303 (a group into which the L* value of the processing subject pixel is classified) is determined to read out the a* correction amount and b* correction amount of the group from the white balance table.

Then, in S305, using the a* correction amount and b* correction amount obtained in S304, the a* value and b* value of the processing subject pixel that has been converted to the L* a* b* value in S303 are corrected. Specifically, the processing is performed in accordance with the following conditions (1) to (4).

(1) With respect to a group corresponding to the processing subject pixel, the median (median value) of brightness of pixels classified into the group is calculated. Specifically, for example, in the processing of S209 of the above-described white balance table forming processing, when the sum total of a* value and sum total of b* value in the reference range of the L* division table are added to the average value of a* value and average value of b* value in the reference group of the white balance table, the brightness of the reference range (for example, the intermediate value of brightness range) and the number of pixels appearing in the reference range are stored separately. Based on the thus stored information, the median (median value) of brightness of pixels classified into the group corresponding to the processing subject pixel is calculated. Instead of the median, the average value of brightness of pixels classified into the group corresponding to the processing subject pixel may be calculated.

(2) If the brightness of the processing subject pixel is equal to the median of brightness of the corresponding group, the a* value and b* value of the processing subject pixel are corrected by directly using the a* correction amount and b* correction amount of the corresponding group. That is, the a* value of the processing subject pixel is corrected by adding the a* correction amount to the a* value of the processing subject pixel, and the b* value of the processing subject pixel is corrected by adding the b* correction amount to the b* value of the processing subject pixel.

(3) If the brightness of the processing subject pixel is higher than the median of brightness of the corresponding group, a* correction amount and b* correction amount fox the brightness of the processing subject pixel are calculated by performing a linear interpolation onto the a* correction amount and b* correction amount of the corresponding group and the a* correction amount and b* correction amount of a group whose brightness is one step higher than the brightness of the corresponding group in the white balance table, respectively. Then, the a* value and b* value of the processing subject pixel are corrected using the a* correction amount and b* correction amount which are resulted from the linear interpolation.

(4) If the brightness of the processing subject pixel is lower than the median of brightness of the corresponding group, a* correction amount and b* correction amount for the brightness of the processing subject pixel are calculated by performing a linear interpolation onto the a* correction amount and b* correction amount of the corresponding group and the a* correction amount and b* correction amount of a group whose brightness is one step lower than the brightness of the corresponding group in the white balance table, respectively. Then, the a* value and b* value of the processing subject pixel are corrected using the a* correction amount and b* correction amount which axe resulted from the linear interpolation.

Then, in S306, the corrected value of the processing subject pixel is converted from the L* a* b* value to the RGB value. Specifically, the Lab value (L*, a*, b*) is first converted into an XYZ value (X, Y, Z) by calculating well-known formulas. Then, the XYZ value (X, Y, Z) is converted to an RGB value (R, G, B) by calculating well-known formulas.

Then, in S307, it is judged whether or not the processing for all the pixels configuring the image to be printed is completed.

If the processing for all the pixels is not yet completed (no in S307), the processing is returned to S303.

On the other hand, if the processing for all the pixels is completed (yes in S307), the white balance correction processing is ended.

On the other hand, if the average values of hue "h" for the groups with range numbers 1-18 in the white balance table do not fall within the predetermined angle width (no in S301), the white balance correction processing is ended without carrying out the processing of S302 to S307. That is, the white balance correction processing is not performed.

Next, the white balance correction function by the printer 10 will be explained by referring to specific examples.

Images (FIG. 9A and FIG. 10A) to be exemplified in the following explanation are those of the ISO/JIS-SCID.

Figure 9A:
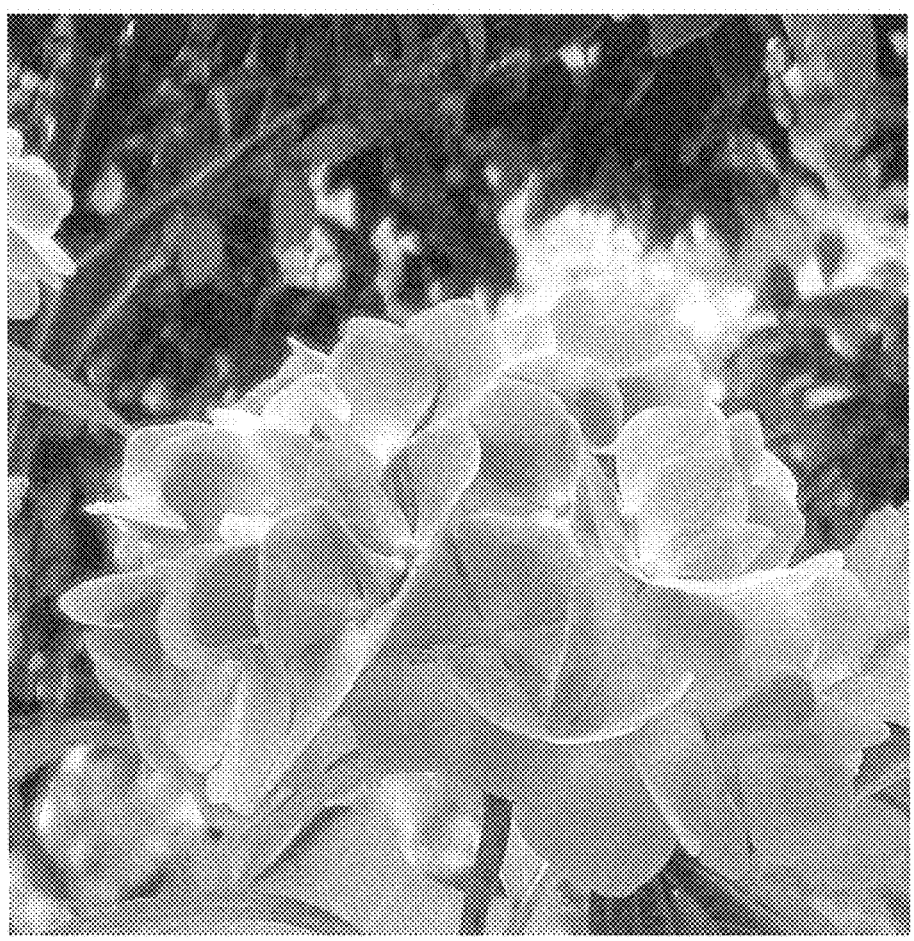
FIG. 9A shows an explanatory diagram of an image of a flower of blue color that is picked up by coming close thereto.

FIG. 9A shows an image of a flower of blue color that is picked up by coming close thereto. In this image, the flower of blue color occupies great majority of the image, but there is raised almost no influence of color balance due to the influence of color temperature of a light source.

Table 1 shows the result of performing the above-described white balance table forming processing of S102 with respect to this picked-up image.

TABLE 1

| Brightness | a* average | b* average | C average | h average |
|---|---|---|---|---|
| Bright | 5.59 | −17.89 | 18.74 | 287.36 |
| ↑ | 12.29 | −34.68 | 36.8 | 289.51 |
| ↑ | 13.17 | −40.65 | 42.73 | 287.95 |
|  | 13.2 | −41.06 | 43.12 | 287.82 |
|  | 6.23 | −31.6 | 32.21 | 281.15 |
|  | 2.84 | −26.29 | 26.44 | 276.17 |
|  | 3.41 | −27.01 | 27.23 | 277.19 |
|  | 2.35 | −25.51 | 25.62 | 275.26 |
|  | 3.25 | −24.32 | 24.53 | 277.61 |
|  | −4.43 | −9.81 | 10.76 | 245.71 |
|  | −13.95 | 8.49 | 16.34 | 148.68 |
|  | −15.65 | 11.78 | 19.59 | 143.02 |
|  | −14.73 | 10.39 | 13.03 | 144.8 |

TABLE 1-continued

| Brightness | a* average | b* average | C average | h average |
|---|---|---|---|---|
|  | −13.9 | 9.57 | 16.88 | 145.44 |
|  | −11.29 | 8.24 | 13.98 | 143.86 |
|  | −10.24 | 6.74 | 12.26 | 146.65 |
|  | −8.38 | 5.25 | 9.89 | 147.94 |
| ↓ | −6.27 | 3.69 | 7.27 | 149.52 |
| ↓ | −4.09 | 2.3 | 4.7 | 150.69 |
| Dark | −1.77 | 0.9 | 1.98 | 153.08 |
| Average | −2.119 | −10.57 | 20.46 | 212.971 |

As shown in Table 1, the average value of a* value and average value of b* value in the entire image are −2.119 and −10.57, respectively, and the entire color balance is deviated toward blue color direction.

Figure 9B:
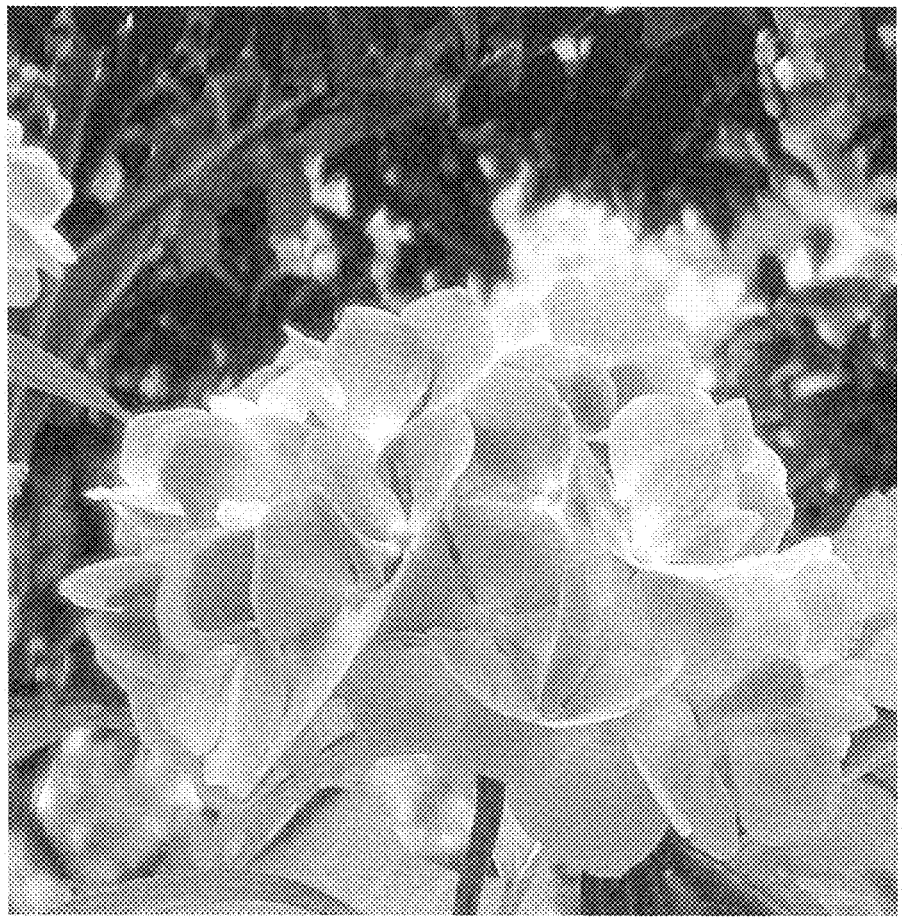
FIG. 9B shows an explanatory diagram of an image that is obtained when the image of FIG. 9A is erroneously subjected to the white balance correction processing.

Based on the theory that the average of color of an image should become achromatic color, if the white balance correction is performed onto the image of FIG. 9A to make the average value of a* value and average value of b* value come close to "0", the entire image will come to be red-tinged, as shown in FIG. 9B, which undesirably deteriorates the image quality.

On the other hand, since the average value of a* value and average value of b* value are calculated for each brightness, the printer 10 can judge the characteristics of this image. That is, as shown in Table 1, as for approximately upper ten groups whose brightness is high, the average value of a* value is deviated to the positive and the average value of b* value is deviated to the negative. On the other hand, as for groups whose brightness is low, the average value of a* value is changed to the negative and the average value of b* value is changed to the positive. With regard to the hue "h", the values of hue "h" of the respective groups are scattered about in a comparatively broad range from 143.02 degrees to 289.51 degrees (an angle width of 146.49 degrees).

In this way, it is known that even if the average of the entire image is deviated toward blue color direction, this is due to the influence of color of a pick-up subject, and is not due to the influence of color temperature of a light source. The printer 10 does not carry out the white balance correction for such an image because of the negative determination in S301 which can prevent inappropriate white balance correction from being performed.

Figure 10A:
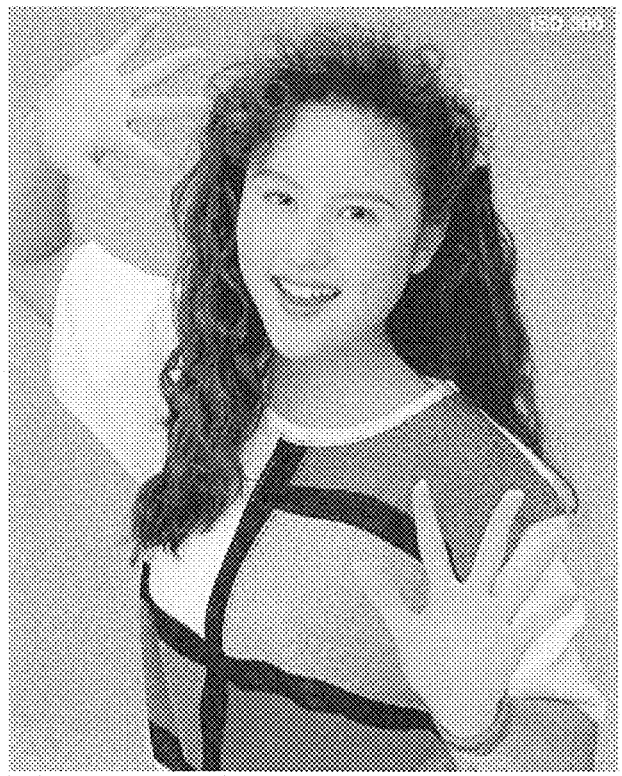
FIG. 10A shows an explanatory diagram of a picked up image of a woman.

FIG. 10A shows a picked up image of a woman. In this image, even if there is no pick-up subject of specific color that occupies great majority of the image, the entire image is deviated toward orange color due to the influence of color temperature of a light source.

Table 2 shows the result of performing the above-described white balance table forming processing of S102 with respect to this picked-up image.

TABLE 2

| Brightness | a* average | b* average | C average | h average |
|---|---|---|---|---|
| Bright | 15.61 | 44.94 | 47.57 | 70.85 |
| ↑ | 26.51 | 55.56 | 61.56 | 64.5 |
| ↑ | 29.41 | 57.18 | 64.3 | 62.78 |
|  | 27.44 | 53.92 | 60.5 | 63.03 |
|  | 25.28 | 50.75 | 56.7 | 63.52 |
|  | 16 | 36.43 | 39.79 | 66.29 |
|  | 12.72 | 31.37 | 33.85 | 67.93 |
|  | 12.78 | 31.5 | 33.99 | 67.93 |
|  | 12.03 | 30.34 | 32.64 | 68.36 |
|  | 12.17 | 30.76 | 33.08 | 68.41 |

TABLE 2-continued

| Brightness | a* average | b* average | C average | h average |
|---|---|---|---|---|
|  | 12.51 | 31.22 | 33.64 | 68.17 |
|  | 12.84 | 31.26 | 33.79 | 67.67 |
|  | 17.34 | 34.32 | 38.45 | 63.19 |
|  | 31.91 | 36.86 | 48.75 | 49.12 |
|  | 14.56 | 25.47 | 29.34 | 60.25 |
|  | 21.5 | 32.49 | 38.96 | 56.5 |
|  | 26.43 | 35.22 | 44.03 | 53.12 |
| ↓ | 22.51 | 24.69 | 33.41 | 47.63 |
| ↓ | 6.36 | 6.44 | 9.05 | 45.37 |
| Dark | 0.66 | 0.42 | 0.78 | 32.48 |
| Average | 17.829 | 34.057 | 38.71 | 60.355 |
| Average to the eighteenth | 19.419 | 37.46 | 42.46 | 62.7361 |

As shown in Table 2, the average value of a* value and average value of b* value in the entire image are 17.829 and 34.057, respectively, and the entire color balance is deviated toward orange color direction.

Furthermore, the average value of a* value and average value of b* value for each group generally transit within orange color range. With regard to the hue "h", the values of hue "h" of the respective groups fall within a comparatively narrow range from 47.63 degrees to 70.85 degrees (an angle width of 23.22 degrees).

Figure 10B:
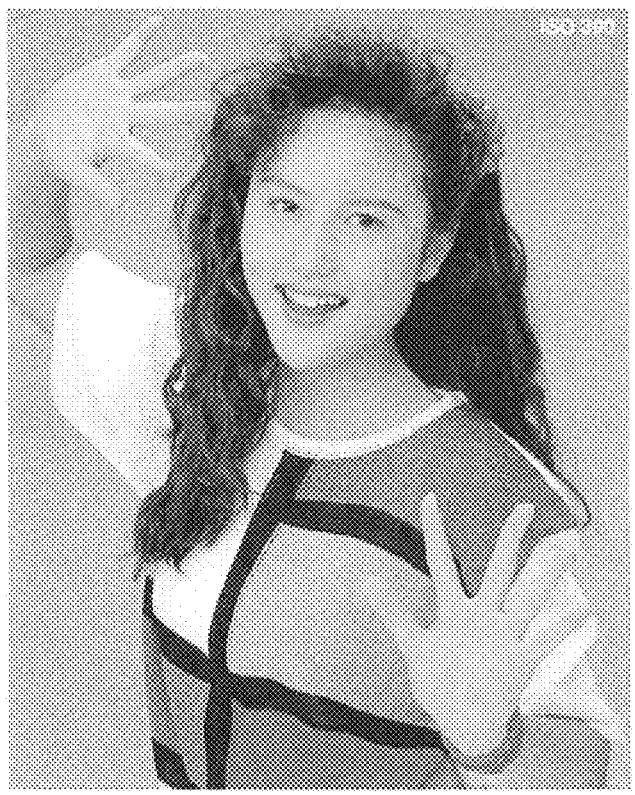
FIG. 10B shows an explanatory diagram of an image that is obtained when the image of FIG. 10A is subjected to the white balance correction processing.

The printer 10 carries out the white balance correction of S302-S307 for such an image because of the affirmative judgment in S301. Specifically, as shown in Table 3, the a* correction amount and b* correction amount are determined for the respective groups (in this example, the adjustment constant is set to 0.8). As a result, color of this image can be naturally corrected into the image shown in FIG. 10B.

TABLE 3

| Brightness | a* average | b* average | C average | h average | correction amount a* | correction amount b* |
|---|---|---|---|---|---|---|
| Bright | 15.61 | 44.94 | 47.57 | 70.85 | −12.488 | −35.952 |
| ↑ | 26.51 | 55.56 | 61.56 | 64.5 | −21.208 | −44.448 |
| ↑ | 29.41 | 57.18 | 64.3 | 62.78 | −23.528 | −45.744 |
|  | 27.44 | 53.92 | 60.5 | 63.03 | −21.952 | −43.136 |
|  | 25.28 | 50.75 | 56.7 | 63.52 | −20.224 | −40.6 |
|  | 16 | 36.43 | 36.79 | 66.29 | −12.8 | −29.144 |
|  | 12.72 | 31.37 | 33.85 | 67.93 | −10.176 | −25.096 |
|  | 12.78 | 31.5 | 33.99 | 67.93 | −10.224 | −25.2 |
|  | 12.03 | 30.34 | 32.64 | 68.36 | −9.624 | −24.272 |
|  | 12.17 | 30.76 | 33.08 | 68.41 | −9.736 | −24.608 |
|  | 12.51 | 31.22 | 33.64 | 68.17 | −10.008 | −24.976 |
|  | 12.84 | 31.26 | 33.79 | 67.67 | −10.272 | −25.008 |
|  | 17.34 | 34.32 | 38.45 | 63.19 | −13.872 | −27.456 |
|  | 31.91 | 38.86 | 48.75 | 49.12 | −25.528 | −29.488 |
|  | 14.56 | 25.47 | 29.34 | 60.25 | −11.648 | −20.376 |
|  | 21.5 | 32.49 | 38.96 | 56.5 | −17.2 | −25.992 |
|  | 26.43 | 35.22 | 44.03 | 53.12 | −21.144 | −28.176 |
| ↓ | 22.51 | 24.69 | 33.41 | 47.63 | −18.008 | −19.752 |
| ↓ | 6.36 | 6.44 | 9.05 | 45.37 | −5.088 | −5.152 |
| Dark | 0.66 | 0.42 | 0.78 | 32.48 | −0.528 | −0.336 |

As described above, according to the printer 10, respective pixels configuring an image are converted to parameters that represent the brightness and color information (color saturation and hue), and the number of pixels appearing in respective brightness levels is examined (S201 to S204). Then, brightness ranges for the respective groups of the predetermined number are set such that the numbers of pixels classified into the groups become equal with each other, and the respective pixels configuring the image are classified into the groups according to the brightness thereof, and the average values of color information are calculated for each of the groups (S205 to S219). By thus calculating the average values of color information for each of the groups, whether or not the average color deviance of the entire image is due to the influence of color of a pick-up subject can be determined.

Thus, according to the printer 10, a plurality of pixels configuring an image are classified into the plurality of (20, in this example) groups according to the brightness thereof (S101, S102), and, in case the average values of hue "h" determined for the groups except for the dark groups do not fall within the predetermined angle width (S301: NO), the white balance correction is not performed. In other words, the correction amount for the white balance correction is set to zero ("0"). Accordingly, according to the printer 10, whether or not the deviance of the average color of an entire picked-up image is due to the influence of color of a pick-up subject is determined correctly and easily, which can effectively prevent the white balance correction from being performed inappropriately.

Furthermore, the printer 10 checks off the average value of hue "h" of the groups whose brightness is low, of the plural groups in the white balance table, from the judgment whether or not the average values of hue "h" fall within the predetermined angle width (S301), thus erroneous determination is hardly raised.

Moreover, according to the printer 10, a plurality of pixels configuring an image are evenly classified into the plurality of groups (S107, S111 to S115, S119). So, with the printer 10, groups which are low in reliability concerning the determination result of average color information (groups in which the number of classified pixels is extremely low) can be prevented from being generated.

In addition, the printer 10 sets the correction amount for the white balance correction to a value, whose absolute value is smaller than the absolute value of a correction amount that can set the average deviance of color information to "0", based on the average deviance of color information determined for each of the groups (S302). Thus, according to the printer 10, an image obtained through the white balance correction can be prevented from becoming unnatural. Furthermore, the printer 10 sets a correction amount for each of the groups as equal to the correction amount corresponding to the median value of brightness of the group, and directly uses the correction amount corresponding to the median value when the brightness of a pixel configuring an image is equal to the median value, and obtains a correction amount by carrying out interpolation based on the relationship with another correction amount corresponding to the median value for the next group when the brightness of the pixel is different from the median value of the corresponding group (S305). Accordingly, the printer 10 can perform appropriate white balance correction for each brightness.

While the invention has been described in detail with reference to the above aspects thereof, it would be apparent to those skilled in the art that various changes and modifications may be made therein without departing from the spirit of the invention.

For example, in the above-described printer 10, all the pixels configuring an image to be printed are classified into the plurality of groups of the white balance table so as to determine correction amounts for the white balance correction. However, only part of the pixels configuring the image to be printed may be classified. In this case, classifying pixels which are evenly sampled from an entire image is desirable. In this way, processing time period can be reduced and storage area which should be reserved can be narrowed.

Furthermore, with the above-described printer 10, judgment is made whether or not the average value of hue "h" calculated for all the groups except for some groups whose brightness is relatively low in the white balance table fall within the predetermined angle width, so as to make a judgment whether or not the white balance correction should be performed (S301). However, whether or not the white balance correction should be performed may be judged based on the average value of a* value and average value of b* value calculated for each group in the white balance table. For example, color information of each group is plotted with the average value of a* value set to the x-axis value and the average value of b* value set to the y-axis value. Then, it is judged whether or not color information of all the groups or all the groups except for some group whose brightness is relatively low fall within a predetermined range (a single quadrant, for example). Then, if the color information does not fall within the predetermined range, the white balance correction is not performed.

Furthermore, with the above-described printer 10, the processing subject pixel is corrected based on the a* correction amount and b* correction amount of a group of the white balance table to which the L* value of the processing subject pixel corresponds to. However, a linear function (y=mx+n) is obtained by connecting the a* correction amount of a group whose brightness is highest and the a* correction amount of a group whose brightness is lowest so as to obtain the a* correction amount according to the brightness of the processing subject pixel. Similarly, another linear function is obtained by connecting the b* correction amount of a group whose brightness is highest and the b* correction amount of a group whose brightness is lowest so as to obtain the b* correction amount according to the brightness of the processing subject pixel. For example, the a* correction amount and b* correction amount in Table 3 are represented by the following formulas (8), (9).

$$a^* \text{ correction amount} = -0.1196 \times L^* - 0.528 \quad \text{formula (8)}$$

$$b^* \text{ correction amount} = -0.35616 \times L^* - 0.336 \quad \text{formula (9)}$$

In this way, the entire image can be corrected toward a fixed direction.

With the above-described printer 10, values obtained by multiplying the a* average value and b* average value by the value (−1) and by the preset adjustment constant (a value less than "1" and greater than "0", for example "0.8") are set to the a* correction amount and b* correction amount, respectively. However, the user can set the adjustment constant by executing input operation using the operation unit 14. In this way, the white balance correction according to the preference of the user can be carried out.

It is noted that the adjustment constant should have a value approximately in a range between about 0.65 and about 0.95, optimally. Next, the reason will be explained.

Human sense has a feature of, when constantly receiving the same stimulation, changing the sensitivity to adapt to the environment. For example, an image which is picked up in a room illuminated by orange light of an incandescent lamp is developed to be an orange-tinged image, but a person who stays in the room does not feel so. Specifically, the person senses orange light at the moment of coming into the room. However, staying in the room for a while, the person comes to be insensitive to the orange light. The reason is that the person adapts to light of the incandescent lamp. The white balance correction is correction processing simulating the function, which performs correction to remove orange color so as to bring about the adapted state even in a room illuminated by orange light. On the other hand, in the CIE (Commission Internationale de l'Éclairage), a model formula of A Colour Appearance Model for Color Management Systems: CIECAM02 is published. This model formula models the manner how color is viewed, and uses a parameter called "adaptation". The following formulas (10) to (12) represent response of RGB in the adapted state. The state is complete adaptation when D=1, and no adaptation when C=0. D factor is represented by the following formula (13).

$$R_c = \left[\left(Y_w \frac{D}{R_w}\right) + (1-D)\right]R \quad \text{formula (10)}$$

$$G_c = \left[\left(Y_w \frac{D}{G_w}\right) + (1-D)\right]G \quad \text{formula (11)}$$

$$B_c = \left[\left(Y_w \frac{D}{B_w}\right) + (1-D)\right]B \quad \text{formula (12)}$$

$$D = F\left[1 - \left(\frac{1}{3.6}\right)e^{\left(\frac{-(L_A+42)}{92}\right)}\right] \quad \text{formula (13)}$$

In the formula (13), F is a parameter that is determined by the brightness of circumference observation environment, and F=1.0 in case of average circumference, F=0.9 in case of darkish circumference, and F=0.8 in case of black circumference. LA represents adaptation luminance. The adaptation luminance may be considered to be the brightness of a pick-up subject. FIG. 11 shows the relation between the adaptation luminance and D factor. When the brightness of a pick-up subject increases, D comes close to "1", and when the brightness of a pick-up subject decreases, D comes close to around "0.6". As shown in FIG. 11, the adaptation parameter transits approximately from 0.65 to 0.95. So, it is known that the adjustment constant should be determined in this range, optimally.

In the above description, image data is directly read out from the memory card 20 to be printed. However, similar processing can be surely performed when image data that is sent through an information processing apparatus such as a personal computer is read out to be printed.

In the above description, the function of determining correction amounts for the white balance correction is provided in a printer. However, this function may be provided in another image forming apparatus such as a copy machine and a facsimile machine. Furthermore, this function may be provided in a digital image pick-up device such as a digital still camera and a digital video camera that picks up an image and stores thus picked-up image as digital information. Moreover, this function may be provided in an information processing apparatus such as a personal computer, which can be specifically realized by installing to the personal computer a program such as the white balance correction program employed in the above description.

In the above description, the average values of the a* value, b* value, hue "h", and color saturation "C" are calculated as representative color information for each group in the white balance table, that is, color information indicative of main or central tendency of color possessed by the plurality of pixels that exist in each group in the white balance table. The average values of the a* value and b* value indicate the average deviance of color information from achromatic color. The a* correction amount and the b* correction amount are determined for each group based on the thus calculated average values of the a* value and the b* value, that is, the average deviance of color information from the achromatic color.

However, as the representative color information, instead of calculating the average values for the a* value, b* value, hue "h", and color saturation "C" in each group, a median value (a value located at the middle when values are lined up in order of size), a mode value (a value whose appearing frequency is the largest), or the like may be calculated for the a* value, b* value, hue "h", and color saturation "C" in each group. The representative values of the a* value and b* value indicate the representative deviance of color information from achromatic color. The a* correction amount and the b* correction amount are determined for each group based on the thus calculated representative values of the a* value and the b* value, that is, the representative deviance of color information from the achromatic color.

In the above description, the correction amount set for each group in the white balance table is determined as a correction amount for the median value of brightness of the group. So, when the brightness of the processing subject pixel is equal to the median value for some group, the correction amount corresponding to the median value of this group is directly used as a correction amount for a processing subject pixel. When the brightness of the processing subject pixel is different from the median value of any group in the white balance table, a correction amount for the processing subject pixel is determined by carrying out interpolation between the correction amount for one group to which the brightness of the processing subject pixel belongs and the correction amount for another group next to the group. Accordingly, even when pixels are those belonging to a brightness range of an identical group, if the pixels are different from on another in their brightness, appropriate different correction amounts are set for the respective pixels according to their brightness. In this way, the white balance correction can be performed accurately. However, the correction amounts set for each group in the white balance table may be used as they are to all the pixels whose brightness belongs to the subject group.

It is noted that in the above description, the correction amount set for each group in the white balance table is determined as a correction amount for the median value of brightness of the group. However, the correction amount set for each group in the white balance table may be determined as a correction amount for the average value of brightness in the group. In such a case, when the brightness of the processing subject pixel is equal to the average value for some group, the correction amount corresponding to the average value of this group is directly used as a correction amount for a processing subject pixel. When the brightness of the processing subject pixel is different from the average value of any group in the white balance table, a correction amount for the processing subject pixel is determined by carrying out interpolation between the correction amount for one group to which the brightness of the processing subject pixel belongs and the correction amount for another group next to the group.

In the above description, the ROM 13 stores therein the white balance correction program. However, the white balance correction program may be stored in other various types of storage medium in a computer-readable manner. Representative examples of the storage medium include a magnetic disc, such as a flexible disc, a magneto optical disc, a semiconductor memory.

What is claimed is:

1. An apparatus for processing an image, comprising:
a classifying unit that classifies at least part of a plurality of pixels configuring an image into a plurality of groups, brightness and color information being defined for each of the pixels configuring the image, the classifying unit classifying each pixel in the at least part of the plurality of pixels into either one of the groups according to the brightness of the each pixel, the color information of each pixel defining a hue value of the each pixel;
a representative color information determination unit determining representative color information for each of the groups based on the color information of pixels that belong to the each group, the representative color information for each group defining a representative hue value of the hue values of the pixels that belong to the each group; and
a judging unit that judges whether or not to perform a white balance correction onto the image by judging whether or not the representative hue values determined for at least part of the plurality of groups are distributed within a predetermined angle width, the at least part of the plurality of groups including two or more groups, the judging unit determining not to perform the white balance correction if the representative hue values for the at least part of the groups are distributed over an angle width that is broader than the predetermined angle width.

2. The apparatus for processing an image according to claim 1, further comprising a pixel correction amount setting unit that sets, for each of the plurality of pixels configuring the image, a pixel correction amount for the white balance correction based on the brightness of the each pixel and based on the representative color information determined for at least one group when the judging unit determines to perform the white balance correction, the pixel correction amount setting unit forcibly setting the pixel correction amount for the white balance correction for each of the pixels configuring the image to a zero value if the judging unit determines not to perform the white balance correction on the image.

3. The apparatus for processing an image according to claim 1, wherein the judging unit excludes the representative hue value for one or more group whose brightness is lower than other groups among the plural groups from the judgment whether or not the representative hue values fall within the predetermined angle width.

4. The apparatus for processing an image according to claim 1, wherein the classifying unit classifies the at least part of the plural pixels configuring the image into the plural groups such that the number of pixels belonging to the respective groups are equal to one another.

5. The apparatus for processing an image according to claim 2, further comprising a representative correction amount setting unit that sets, for each group, a representative correction amount for the white balance correction based on the representative color information determined for the each group,
wherein the pixel correction amount setting unit determines the pixel correction amount for each of the plurality of pixels configuring the image based on the brightness of the subject pixel and based on the representative correction amount for the white balance correction set for at least one group,
wherein the color information of each pixel further defines a deviance value of color of the each pixel from achromatic color, the representative color information for each group further defining a representative deviance value for the deviance values of the color of the pixels belonging to the each group, and
wherein the representative correction amount setting unit sets the representative correction amount for the white balance correction for each group based on the representative deviance value determined for the each group.

6. The apparatus for processing an image according to claim 5, wherein the representative correction amount setting unit sets the representative correction amount for the white balance correction for each group to a value that will shift the representative deviance value for each group by an amount smaller than another amount that is required to shift the representative deviance value for the each group to zero (0).

7. The apparatus for processing an image according to claim 2, further comprising a correction unit correcting the color information of each of the pixels configuring the image based on the pixel correction amount for the white balance correction set for the each pixel, while maintaining unchanged the brightness of the each pixel.

8. The apparatus for processing an image according to claim 2, further comprising a representative correction amount setting unit that sets, for each group, a representative correction amount for the white balance correction based on the representative color information determined for the each group,
wherein the pixel correction amount setting unit determines the pixel correction amount for each of the plurality of pixels configuring the image based on the brightness of the subject pixel and based on the representative correction amount for the white balance correction set for a group to which the subject pixel belongs.

9. The apparatus for processing an image according to claim 1, wherein the representative hue value for each group is an average value of hue values of the pixels belonging to each group.

10. The apparatus for processing an image according to claim 5, wherein the representative deviance value for each group is an average value of deviance values of colors of the pixels belonging to the each group.

11. An apparatus for processing an image, comprising:
a classifying unit that classifies at least part of a plurality of pixels configuring an image into a plurality of groups, brightness and color information begin defined for each of the pixels configuring the image, the classifying unit classifying each pixel in the at least part of the plurality of pixels into either one of the groups according to the brightness of the each pixel, the color information of each pixel defining a hue value of the each pixel;
an average color information determination unit determining average color information for each of the groups based on the color information of pixels that belong to the each group, the average color information for each group defining an average hue value of the hue values of the pixels that belong to the each group; and
a judging unit that judges whether or not to perform a white balance correction onto the image by judging whether or not the average hue values determined for at least part of the plurality of groups are distributed within a predetermined angle width, the at least part of the plurality of groups including two or more groups, the judging unit determining not to perform the white balance correction if the average hue values for the at least part of the groups are distributed over an angle width that is broader than the predetermined angle width.

12. The apparatus for processing an image according to claim 11, further comprising a pixel correction amount setting unit that sets, for each of the plurality of pixels configuring the image, a pixel correction amount for the white balance correction based on the brightness of the each pixel and based on the average color information determined for at least one group when the judging unit determines to perform the white balance correction, the pixel correction amount setting unit forcibly setting the pixel correction amount for the white balance correction for each of the pixels configuring the image to a zero value if the judging unit determines not to perform the white balance correction onto the image.

13. The apparatus for processing an image according to claim 11, wherein the judging unit excludes the average hue value for one or more group whose brightness is lower than other groups among the plural groups from the judgment whether or not the average hue values fall within the predetermined angle width.

14. The apparatus for processing an image according to claim 11, wherein the classifying unit classifies the at least part of the plural pixels configuring the image into the plural groups such that the number of pixels belonging to the respective groups are equal to one another.

15. The apparatus for processing an image according to claim 12, further comprising an average correction amount setting unit that sets, for each group, an average correction amount for the white balance correction based on the average color information determined for the each group,
wherein the pixel correction amount setting unit determines the pixel correction amount for each of the plurality of pixels configuring the image based on the brightness of the subject pixel and based on the average correction amount of the white balance correction set for at least one group,
wherein the color information of each pixel further defines a deviance value of color of the each pixel from achromatic color, the average color information for each group further defining an average deviance value for the deviance values of the colors of the pixels belonging to the each group, and
wherein the average correction amount setting unit sets the average correction amount for the white balance correction for each group based on the average deviance value determined for the each group.

16. The apparatus for processing an image according to claim 15, wherein the average correction amount setting unit sets the average correction amount for the white balance correction for each group to a value that will shift the average deviance value for the each group by an amount smaller than another amount that is required to shift the average deviance value for the each group to zero (0).

17. The apparatus for processing an image according to claim 12, further comprising a correction unit correcting the color information of each of the pixels configuring the image based on the pixel correction amount for the white balance correction set for the each pixel, while maintaining unchanged the brightness of the each pixel.

18. The apparatus for processing an image according to claim 12, further comprising an average correction amount setting unit that sets, for each group, an average correction amount for the white balance correction based on the average color information determined for the each group,
wherein the pixel correction amount setting unit determines the pixel correction amount for each of the plurality of pixels configuring the image based on the brightness of the subject pixel and based on the average correction amount for the white balance correction set for a group to which the subject pixel belongs.

19. A method for processing an image, comprising:
classifying at least part of a plurality of pixels configuring an image into a plurality of groups, brightness and color information being defined for each of the pixels configuring the image, each pixel in the at least part of the plurality of pixels being classified into either one of the groups according to the brightness of the each pixel, the color information of each pixel defining a hue value of the each pixel;

determining representative color information for each of the groups based on the color information of pixels that belong to the each group, the representative color information for each group defining a representative hue value of the hue values of the pixels that belong to the each group; and judging whether or not to perform a white balance correction onto the image by judging whether or not the representative hue values determined for at least part of the plurality of groups are distributed within a predetermined angle width, the at least part of the plurality of groups including two or more groups, the judging determining not to perform the white balance correction if the representative hue values for the at least part of the groups are distributed over an angle width that is broader than the predetermined angle width.

20. A method for processing an image, comprising:

classifying at least part of a plurality of pixels configuring an image into a plurality of groups, brightness and color information being defined for each of the pixels configuring the image, each pixel in the at least part of the plurality of pixels being classified into either one of the groups according to the brightness of the each pixel, the color information of each pixel defining a hue value of the each pixel;

determining average color information for each of the groups based on the color information of pixels that belong to the each group the average color information for each group defining an average hue value of the hue values of the pixels that belong to the each group; and judging whether or not to perform a white balance correction to the image by judging whether or not the average hue values determined for at least part of the plurality of groups are distributed within a predetermined angle width, the at least part of the plurality of groups including two or more groups, the judging determining not to perform the white balance correction if the average hue values for the at least part of the groups are distributed over an angle width that is broader than the predetermined angle width.

21. A non-transitory storage medium storing a set of program instructions executable on a data processing device, instructions comprising:

classifying at least part of a plurality of pixels configuring an image into a plurality of groups, brightness and color information being defined for each of the pixels configuring the image, each pixel in the at least part of the plurality of pixels being classified into either one of the groups according to the brightness of the each pixel, the color information of each pixel defining a hue value of the each pixel;

determining representative color information for each of the groups based on the color information of pixels that belong to the each group, the representative color information for each group defining a representative hue value of the hue values of the pixels that belong to the each group; and judging whether or not to perform a white balance correction onto the image by judging whether or not the representative hue values determined for at least part of the plurality of groups are distributed within a predetermined angle width, the at least part of the plurality of groups including two or more groups, the judging determining not to perform the white balance correction if the representative hue values for the at least part of the groups are distributed over an angle width that is broader than the predetermined angle width.

22. A non-transitory storage medium storing a set of program instructions executable on a data processing device, instructions comprising:

classifying at least part of a plurality of pixels configuring an image into a plurality of groups, brightness and color information being defined for each of the pixels configuring the image, each pixel in the at least part of the plurality of pixels being classified into either one of the groups according to the brightness of the each pixel, the color information of each pixel defining a hue value of the each pixel;

determining average color information for each of the groups based on the color information of pixels that belong to the each group, the average color information for each group defining an average hue value of the hue values of the pixels that belong to the each group; and judging whether or not to perform a white balance correction onto the image by judging whether or not the average hue values determined for at least part of the plurality of groups are distributed within a predetermined angle width, the at least part of the plurality of groups including two or more groups, the judging determining not to perform the white balance correction if the average hue values for the at least part of the groups are distributed over an angle width that is broader than the predetermined angle width.

23. An apparatus for processing an image, comprising:

a classifying unit that classifies at least part of a plurality of pixels configuring an image into a plurality of groups, brightness and color information being defined for each of the pixels configuring the image, the color information of each pixel defining a hue value of the each pixel, the classifying unit classifying each pixel in the at least part of the plurality of pixels into either one of the groups according to the brightness of the each pixel;

a representative color information determination unit determining representative color information for each of the groups based on the color information of pixels that belong to the each group, the representative color information for each group defining a representative hue value of the hue values of the pixels that belong to the each group; and a pixel correction amount setting unit that is capable of setting a pixel correction amount for a white balance correction for each of the plurality of pixels configuring the image, the pixel correction amount setting unit setting the pixel correction amount for each pixel either:

based on the representative hue value determined for at least part of the groups, or based on the representative hue value determined for the at least part of the groups, the brightness of the each pixel, and the representative color information determined for at least one group.

24. The apparatus for processing an image according to claim 23, wherein the pixel correction amount setting unit is configured to:

if the representative hue values determined for at least part of the plurality of groups are distributed over an angle width that is broader than a predetermined angle width, set the pixel correction amount to zero (0), the at least part of the plurality of groups including two or more groups, and if the representative hue values determined for the at least part of the plurality of groups are distributed within the predetermined angle width, set the pixel correction amount based on brightness of the each pixel and the representative color information determined for at least one group.

* * * * *